(12) United States Patent
Lehmann et al.

(10) Patent No.: US 7,494,084 B2
(45) Date of Patent: Feb. 24, 2009

(54) DEVICE AND METHOD TO PRODUCE HELICAL COILS FROM A FILAMENT

(75) Inventors: Hartmut Lehmann, Nürtingen (DE); Gunnar Vieth, Grossbettlingen (DE)

(73) Assignee: Kugler-Womako GmbH, Neurtingen (DE)

( * ) Notice: Subject to any disclaimer, the term of this patent is extended or adjusted under 35 U.S.C. 154(b) by 728 days.

(21) Appl. No.: 11/117,692

(22) Filed: Apr. 29, 2005

(65) Prior Publication Data

US 2005/0253014 A1 Nov. 17, 2005

(30) Foreign Application Priority Data

Apr. 30, 2004 (DE) ........................ 10 2004 021 776

(51) Int. Cl.
*B65H 54/00* (2006.01)
*B65H 55/00* (2006.01)

(52) U.S. Cl. ........................ 242/470; 242/570; 242/600; 425/110; 425/112

(58) Field of Classification Search ................. 242/430, 242/443, 470, 484.6, 570, 600, 486.1, 433.2, 242/433.4, 434.9, 436; 156/169, 173, 175, 156/242, 425; 425/110, 112; 72/127, 141, 72/142, 145

See application file for complete search history.

(56) References Cited

FOREIGN PATENT DOCUMENTS

| CH | 329748 P | 6/1958 |
|---|---|---|
| DE | 1 254 854 AS | 11/1967 |
| DE | 1 944 371 P | 1/1972 |

*Primary Examiner*—Eric Hug
*Assistant Examiner*—Saeed Huda
(74) *Attorney, Agent, or Firm*—Venable LLP; Robert Kinberg; Steven J. Schwarz

(57) ABSTRACT

Presented are a device and a method to produce helical coils from a filament, preferably consisting of plastic. A rotatable winding spindle and an associated filament-shaping device are provided to wind up the filament in a helical pattern, whereby the winding spindle extends beyond the filament-shaping device in the feed direction of the filament to be wound up. Viewed in the feed direction of the filament to be wound onto the winding spindle, a pressing device is provided downstream of the filament-shaping device that presses the filament against the winding spindle and is designed to generate a predominantly adequate friction contact between the filament and the winding spindle so that the rotation of the winding spindle essentially takes along the filament into the winding direction.

16 Claims, 4 Drawing Sheets

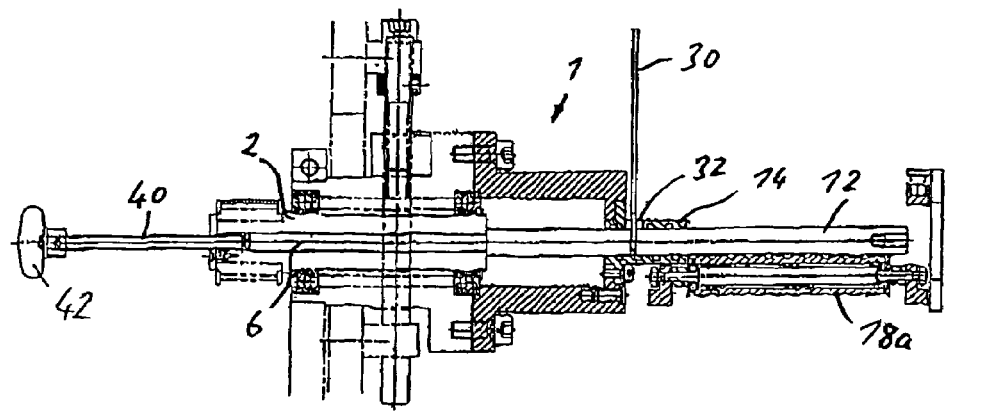
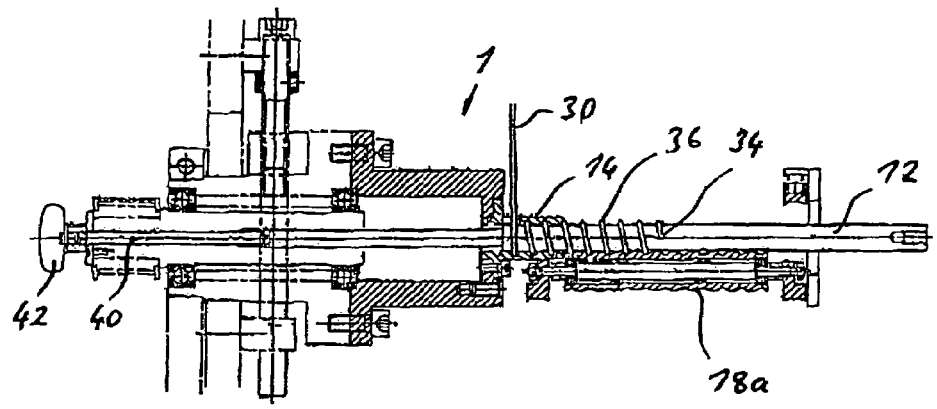
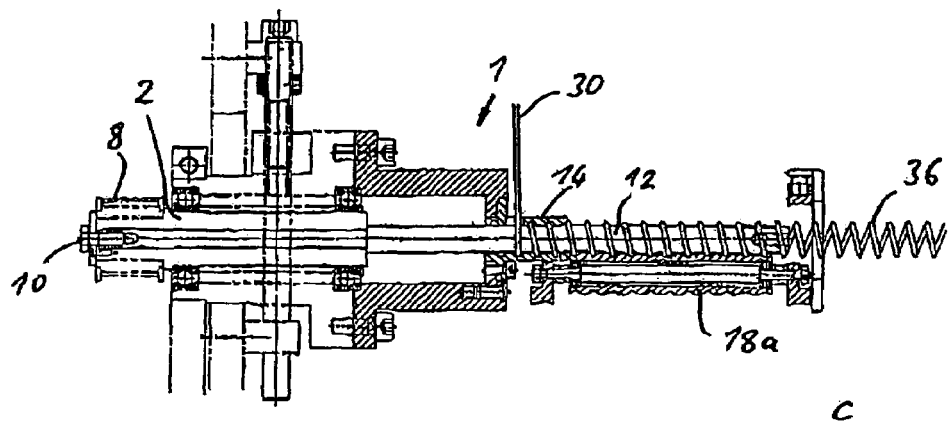
Fig. 4

DEVICE AND METHOD TO PRODUCE HELICAL COILS FROM A FILAMENT

CROSS-REFERENCE TO RELATED APPLICATION

This application claims the priority of German Patent Application No. 10 2004 021 776.9-16, filed on Apr. 30, 2004, the subject matter of which is incorporated herein by reference. The disclosure of all U.S. patents and patent applications mentioned below are also incorporated herein by reference.

BACKGROUND OF THE INVENTION

The invention relates to a device to produce helical coils from a filament, preferably of plastic, comprising a rotatable and preferably smooth winding spindle and an associated filament-shaping device to wind the filament onto the winding spindle in a helical pattern, whereby the winding spindle extends—as seen along the feed direction of the filament to be wound upon it—beyond the filament-shaping device. The invention further relates to a method to produce a helical coil from a filament—preferably consisting of plastic—preferably using a device of the type mentioned above.

A device and method of this type are disclosed in DE 1 944 371, for example, whereby a plastic filament is wound onto a smooth winding spindle in order to create a helical coil. In this prior-art device, the filament-shaping device comprises a sleeve that the winding spindle passes through and that is provided with a helical groove along its inner wall, forming a so-called pitch guide tube. Arranged at the outlet of the filament-shaping device is a filament-cooling device, through which the winding spindle extends as well. Similar to the filament-shaping device, the filament-cooling device downstream thereof also comprises a pitch guide tube, in order to be able to continue to guide the filament in a helical path. The overall design of this prior-art device is quite complex, in particular due to the fact that the filament-cooling device is realized as a pitch guide tube.

SUMMARY OF THE INVENTION

It is the objective of the present invention to improve a device and a method of the type mentioned above in such a manner as to allow a less complicated design.

This objective is met by a device for producing helical coils from a preferably plastic filament, comprising a rotatable and preferably smooth winding spindle and an associated filament-shaping device to wind the filament in a helical pattern onto the winding spindle, whereby the winding spindle extends—as seen along the feed direction of the filament to be wound onto it—beyond the filament-shaping device, characterized in that downstream—viewed along the feed direction of the filament to be wound onto the winding spindle—of the filament-shaping device is provided a pressing device, which presses the filament against the winding spindle and is realized in such a manner as to generate a predominantly adequate friction contact between the filament and the winding spindle, so that during a rotation of the winding spindle the filament is engaged and pulled along in the direction of winding.

In the design according to this invention, the function of the filament-shaping device is limited to the feeding and shaping of the filament, whereas the transport of the helical coil produced in this manner is effected by a combined rotating and advance movement caused by the interaction of the winding spindle and the pressing device. The latter is achieved by the invention by generating a predominantly adequate friction contact between the filament and the winding spindle, as a result of which the filament is taken along the winding direction by the rotating winding spindle. The option of the winding spindle possessing a preferably smooth surface does not represent a contradiction in this connection; the term "smooth" in this context only means that the surface or casing of the winding spindle does not possess any bumpy surface irregularities. In this connection, the invention makes use of the fact that the coil retains its helical shape after it has been formed by the filament-shaping device.

The invention allows the production of helical coils of nearly unlimited length using a winding spindle of limited length. This allows a particularly compact design of the device.

The fact that the invention provides for a downstream pressing device makes it possible to use a comparatively short version of the rather expensive filament-shaping device, which then constitutes only a comparatively small constructional unit, while the required design of the pressing device is comparatively uncomplicated. In this manner it becomes possible to reduce the expense of the overall design of the device in comparison to the state of technology.

Furthermore, the design according to the invention requires less effort to be adapted to different pitches and diameters of helical coils to be manufactured. In this case, it is usually necessary to stock different filament-shaping devices, but since the size of these can be significantly reduced in comparison to the state of the art, the associated costs will not be very significant.

DE 1 254 854 discloses a similar device to produce filaments coiled in a helical pattern from a thermoplastic plastic material, whereby the device comprises a pressure roller, among other elements. However, this pressure roller acts upon a sleeve that concentrically surrounds the winding spindle, constitutes the filament-shaping device, and possesses a continuous—and thus open to the exterior—helical groove as the pitch guide tube. In this case, the role of the pressure roller is to prevent the filament from accidentally jumping out of the pitch guide tube of the sleeve. Hence, the pressure roller is in contact with the exterior surface of the sleeve in order to seal the helical groove that is open towards the exterior. Consequently, this pressure roller is neither intended nor able to create a frictional lock between the filament and the winding spindle.

CH 329 748 illustrates a similar device for the production of helical wire turns from a thermoplastic material, whereby two supporting rollers are provided on the outlet side. However, these supporting rollers are located downstream of, and therefore outside of the winding spindle, and only serve—as suggested by their name—to support the coil, which at this point no longer is situated on the winding spindle. Thus, these supporting rollers can not perform a pressing function to create a friction lock between the filament and the winding spindle.

It is practical for the pressing device to feature at least one pressure element, which is movable towards the winding spindle, preferably predominantly in the radial direction. Such a pressure element can be exchanged particularly easily in order to be able to adapt the device for the manufacturing of coils of various pitches and diameters. Preferably, this at least one pressure element is preloaded in the direction towards the winding spindle, in order to create the friction lock between the filament and the winding spindle in a particularly effective manner. The preloading usually is generated with the help of spring devices, whereby the initial bias has to be adjusted in such a manner so that a substantially sufficient friction contact is generated between the filament and the winding spindle, so that the filament is taken along the winding direction by the rotating winding spindle. On the other hand, the pressure element has to be configured in a manner that ensures that any friction between the pressure element and the filament will be lower than the friction between the filament and the surface of the winding spindle, so that the above-mentioned condition can be met.

The pressing device should comprise several pressure elements, which are distributed along the circumferential direction of the winding spindle and preferably are spaced with respect to each other. The distances between the individual pressure elements should be essentially constant. For most applications it should be sufficient to provide three pressure elements that are separated by angular distances of approximately 120°.

The at least one pressure element should possess at least one guiding groove on its side that faces the winding spindle to accept the filament.

If several pressure elements are provided, the guiding grooves of the pressure elements should be offset with respect to each other corresponding to the pitch of the helical shape, in order to take into account the helical shape of the coils formed in the filament-shaping device.

But it is also possible for the at least one pressure element to possess on its side facing the winding spindle a row of essentially parallel guiding grooves, whereby the spacing between the guiding grooves corresponds to the spacing of the individual turns of the helical shape. In this embodiment, the guiding groove rows of the pressure elements should be arranged offset with respect to each other in accordance with the pitch of the helical shape.

A particularly favoured embodiment of the invention is characterized in that at least one pressure element is realized as a rotatable roller, with an axis of rotation that preferably extends predominantly in parallel to the axis of rotation of the winding spindle. The rotatable roller should be able to rotate freely; no drive is required. This ensures that the friction between the pressure element and the filament is lower than that between the filament and the winding spindle, allowing the creation of the friction lock with the winding spindle that is necessary to generate movement.

The filament-shaping device usually possesses a sleeve that concentrically surrounds the winding spindle and possesses a helical filament guide, whereby the wall of the sleeve should feature an opening to allow the filament to enter into the helical filament guide.

A further especially preferred embodiment is characterized in that the winding spindle comprises anchoring means to secure the filament to be wound up, and is movable along the axial direction between a first position, in which the anchoring means is located in the upstream—as seen along the feed direction of the filament to be wound onto the winding spindle—region of the filament-shaping device and a second position, in which the anchoring means is located in the region of the pressing device. This embodiment allows a particularly uncomplicated set-up of the device for a subsequent continuous production of a helical coil by attaching the beginning of the filament to the winding spindle with the help of the anchoring means and by subsequently subjecting the winding spindle to a combined advance and rotational movement, in order to introduce the filament into the shaping device in a carefully directed manner and to carry it through the shaping device, whereupon the continuous manufacturing process commences. It is practical if the anchoring means in this embodiment is a hole formed in the casing of the winding spindle, into which the filament is inserted to fasten it to the winding spindle.

A driving device is usually provided to drive the winding spindle in a continuous rotating manner. An advantageous further development of the last-described embodiment is characterized in that the driving device can optionally be coupled to or decoupled from the winding spindle when the winding spindle is in its first position, and is always decoupled from the winding spindle when the winding spindle is predominantly out of its first position.

In connection with the last-mentioned embodiment, we further describe as part of the invention a method to form helical coils from a filament, preferably of plastic, comprising the following steps:

attaching the end of the filament to the winding spindle with the help of the anchoring means when the winding filament is in its first position, rotating the winding spindle and simultaneously moving it from the first position towards the second position and in this manner guiding the filament through the filament-shaping device and winding it onto the winding spindle in a helical pattern, under continued rotation and axial movement of the winding spindle, forcing the filament wound on the winding spindle to engage with the pressing device, stopping the movement of the winding spindle when the winding spindle has reached its second position, detaching the filament from the anchoring means at the winding spindle, and continuously rotating the winding spindle without any further axial movement.

After the filament has been detached from the anchoring means, the winding spindle should first of all be moved from its second position to its first position or at least towards its first position, whereupon in its stationary state without any further axial movement it will be subjected to a continued continuous rotation, for which it is practical to couple the above-mentioned driving device to the winding spindle.

BRIEF DESCRIPTION OF THE DRAWINGS

In the following, a preferred embodiment example of the invention is explained in more detail with the help of figures.

FIGS. 4a to 4c show various operating states of the device of FIG. 1.

DETAILED DESCRIPTION OF THE INVENTION

Figure 1:
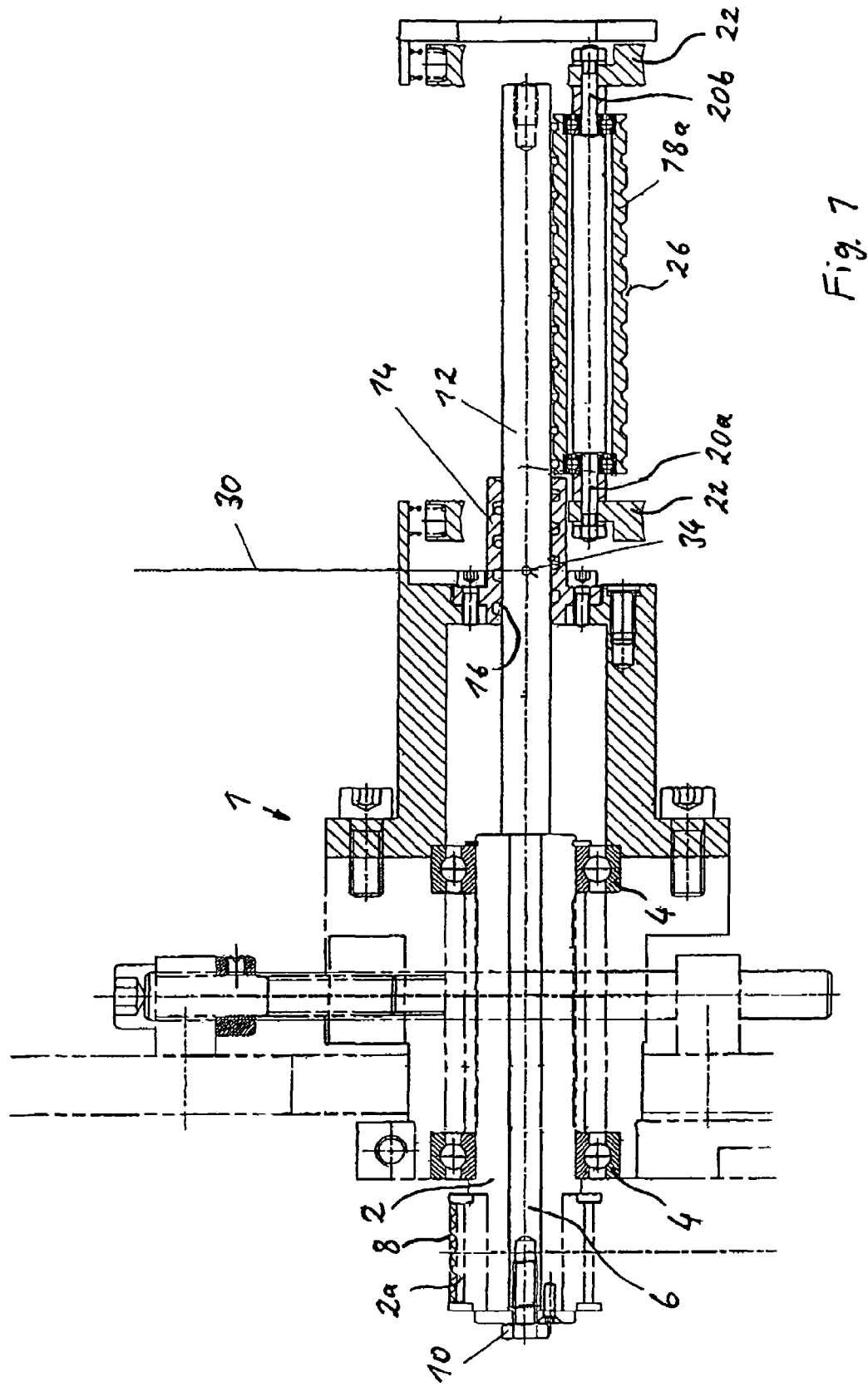
FIG. 1 shows in a schematic longitudinal section the relevant components of a device for forming helical coils in accordance with a preferred embodiment example of the invention.

As discernable in FIG. 1, the illustrated device comprises a rigid housing component 1, in which a hollow shaft 2 is supported in a rotatable manner by means of ball bearings 4 and is secured against a longitudinal movement in a manner known in the art. A pin 6 is arranged concentrically within the hollow shaft 2. The exposed exterior end section 2a of the hollow shaft 2 is realized as co-axial roller, over which runs a driving belt 8, which is driven by a driving device that is not shown. While the hollow shaft 2 is stationary, the interior pin 6 is fundamentally free to rotate with respect to the surrounding hollow shaft 2 and is free to move in the axial direction. However, a link between the pin 6 and the hollow shaft 2 that is rigid with respect to rotation and displacement can be created with the help of a screw connection 10 at the exposed outer end.

On the opposite side, a winding spindle 12 is arranged coaxially at the pin 6. The winding spindle 12 usually is connected to the pin 6 as one piece and forms a structural unit. The winding spindle 12 is a cylindrical rod that extends beyond the stationary housing part 1 (to the right in FIG. 1). Additional bearings are usually provided for the winding spindle 12, but these are not shown in detail in the enclosed figures. Since there is a rotationally rigid connection between the winding spindle 12 and the pin 6, the winding spindle 12 is made to rotate by the not-shown driving device via the driving belt 8, the hollow shaft 2, and the pin 6, provided that a rotationally rigid link has been established between the hollow shaft 2 and the pin 6 with the help of the screw connection 10.

Also shown in FIG. 1 is that the winding spindle 12 extends through a shell-like sleeve 14, which is flanged onto the stationary housing part 1. A helical groove 16 has been cut into the inner wall that delimits the bore of the sleeve 14. This helical groove 16 forms a so-called pitch guide tube, with a pitch that essentially corresponds to the pitch of the helical shape of the coils to be produced.

Figure 2:
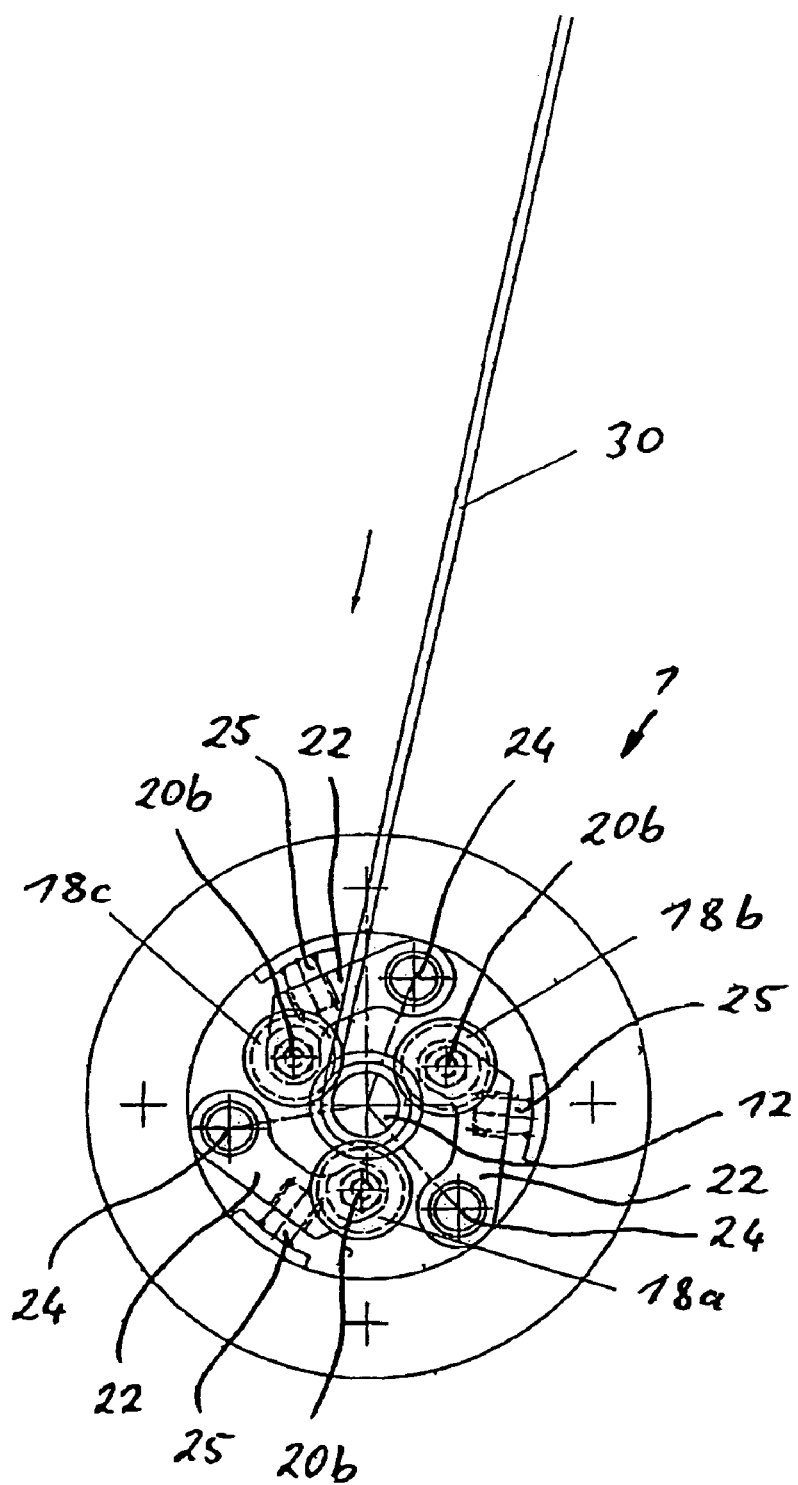
FIG. 2 is a schematic transverse section of the device of FIG. 1.

Grooved rollers are arranged adjacent to the exposed section of the winding spindle 12 outside of the sleeve 14. As illustrated in FIG. 2, the illustrated embodiment example is provided with three grooved rollers 18a, 18b, and 18c, which are separated by an angular distance of 120°. But it is also possible to choose a different number of grooved rollers. The grooved rollers 18a, 18b, and 18c are arranged axially parallel to the winding spindle 12. As shown particularly clearly in FIGS. 1 and 3, each grooved roller 18a, 18b, and 18c is supported rotatable on its ends by coaxial bearing pins 20a and 20b. Each bearing pin 20a, 20b is attached to a lever 22, which in the illustrated embodiment example extends at right angles to the respective bearing pin 20a, 20b and is hinged to the stationary housing part 1 by a hinge 24 (compare FIG. 2). Since each grooved roller 18a, 18b, 18c is supported rotatable at its ends by two bearing pins 20a, 20b, two corresponding parallel levers 22 are associated with every grooved roller 18a, 18b, 18c, whereby the swiveling axes of the respective associated hinges 24 coincide and are oriented in parallel to the rotational axes of the winding spindle 12, the grooved rollers 18a, 18b, 18c, and the bearing pins 20a, 20b.

The bearing pins 20a, 20b, the levers 22, and the associated hinges 24 form a bearing system, which on the one hand allows free coasting rotation of the grooved rollers 18a, 18b, 18c, and on the other hand allows the grooved rollers 18a, 18b, 18c to swivel at right angles to their rotational axes, towards and away from the winding spindle 12. In this, the levers 22 are spring-loaded towards the winding spindle 12 with the help of spring devices 25 shown in FIG. 2. As a result, in their normal operating state, the grooved rollers are in contact with the winding spindle 12, as illustrated by the example of the grooved roller 18a in FIG. 1.

Figure 3:
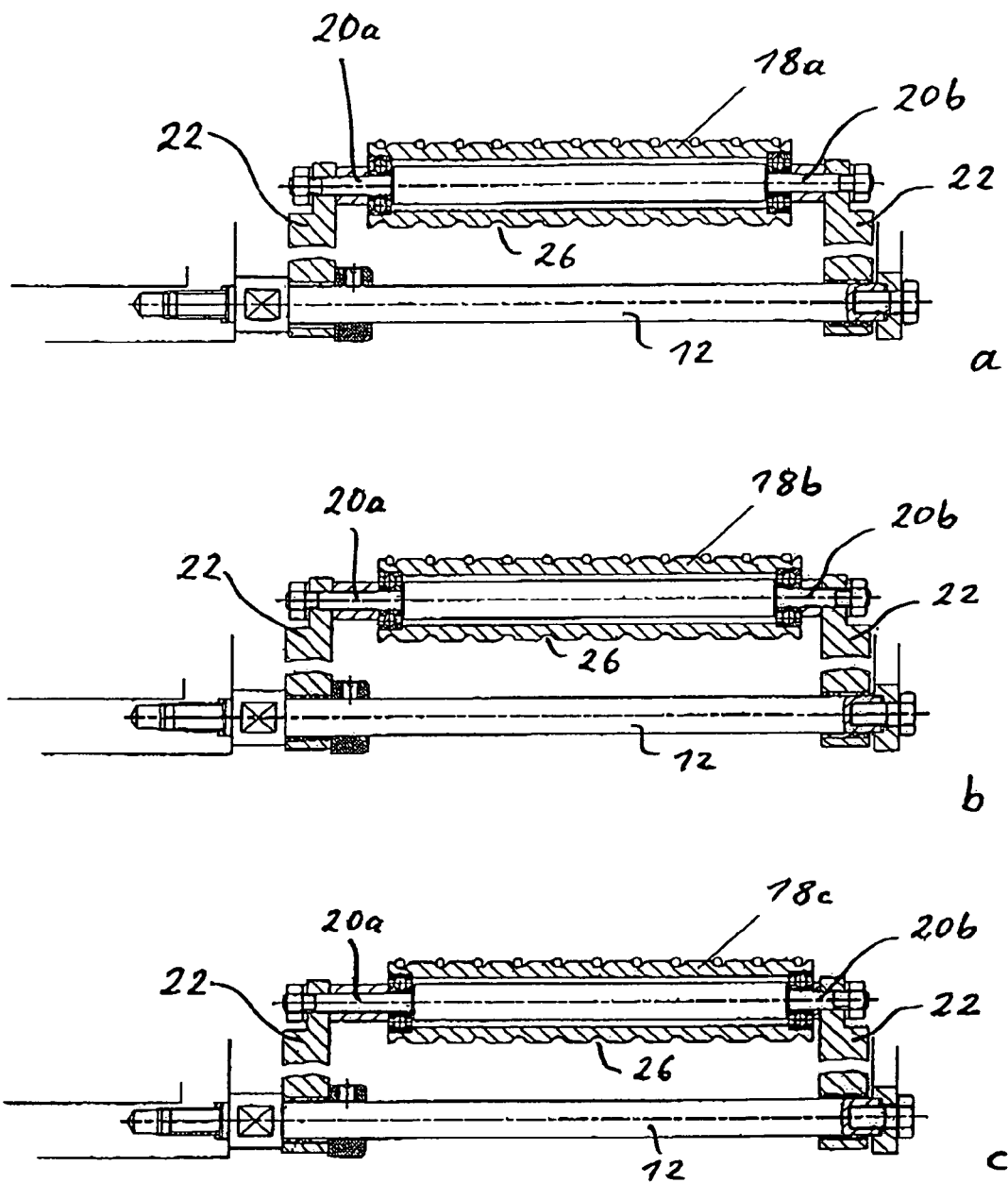
FIGS. 3a to 3c show schematic partial views of a longitudinal section of the configuration of three grooved rollers in the device of FIG. 1.

As further illustrated in FIGS. 1 and 3, a row of concentric circumferential closed grooves 26 is formed on the exterior surface or casing of each grooved roller 18a, 18b, 18c, whereby the spacing between any two adjacent annular grooves 26 is constant and corresponds to the pitch of the helical shape of the coil to be produced. The depth of the grooves 26 is dimensioned so that they can accept a filament 30 for forming a helical coil and so that the filament 30 will be pressed against the exterior surface or casing of the winding spindle 12 by the respective grooved roller 18a, 18b, 18c, when the grooved rollers 18a, 18b, 18c are spring-loaded towards the winding spindle 12.

As mentioned earlier, the illustrated embodiment example is provided with three grooved rollers 18a, 18b, 18c that are arranged around the winding spindle 12 and separated from each other by an angular distance of 120°, as illustrated in FIG. 2. To take into account the pitch of the helical shape of the coils that are to be produced from the filament that is accepted into the grooves 26, the three grooved rollers 18a, 18b, 18c are offset with respect to each other, in particular by one third of the pitch of the desired helical shape. This offset arrangement is schematically illustrated in FIG. 3a to 3c and can also be recognized from the fact that for each of the grooved rollers 18a, 18b, 18c the length of the associated axle pins 20a and 20b is correspondingly different, since in the illustrated embodiment example the levers 22 carrying the axle pins 20a and 20b are all situated in a common plane.

In the following, FIG. 4 will be used to explain the threading of the filament 30 and the initial phase of the subsequent continuous manufacturing of helical coil.

As shown in FIG. 4a and correspondingly in FIG. 1, the winding spindle initially is in a retracted first position. However, in contrast to FIG. 1, the screw connection 10 is opened, so that the pin 6 and the winding spindle 12 attached thereto are freely movable in both the rotational direction and the axial direction. In place of the screw connection 10, a so-called auxiliary turning tool 40 is screwed to the exterior exposed end of the pin 6, whereby the auxiliary turning tool possesses a turning knob 42, as illustrated in FIG. 4. In the operating state shown in FIG. 4a, the filament 30 has been inserted into the sleeve 14 through an opening 32 in the sleeve 14 and the filament's end has been inserted into a hole 34, which is formed in the casing of the winding spindle 12 and serves as anchoring means for the filament 30 at the winding spindle 12 (compare FIG. 1). In this, the filament 30 has already been guided in a manner so that it engages into the helical groove 16 (compare FIG. 1).

Subsequently, the winding spindle 12 is manually turned and simultaneously moved in the axial direction by means of the auxiliary turning tool 40. As a result of such a combined turning and advance movement of the winding spindle 12, the filament 30 is threaded through the pitch guide tube of the sleeve 14, while simultaneously the winding spindle 12 continues its motion (to the right in FIG. 4), so that the filament 30 travels through the sleeve 14 along the helical groove 16 and emerges from the sleeve 14 as a helical coil 36, after which it engages with the grooves 26 of the grooved rollers 18a, 18b, 18c. This state is shown in FIG. 4b.

Once a sufficient number of turns of the helical coil 36 has been produced in this manner, the winding spindle 12 is stopped, so that it no longer is subjected to any further combined turning and advance movement. Now the winding spindle 12 has reached a second position, which is illustrated in FIG. 4b.

When the winding spindle 12 has been stopped and is in this second position, the filament 30 is cut off at the hole 34 and thus is detached from the winding spindle 12.

Subsequently, the winding spindle 12 is manually pulled back to its first position with the help of the auxiliary turning tool 40, without any additional rotation of the winding spindle 12. During this axial return movement of the winding spindle 12, the helical coil 12 produced so far remains in the position shown in FIG. 4b. The fact that the winding spindle 12 possesses a smooth surface or casing surface allows the described axial movement with respect to the helical coil 36 that surrounds the winding spindle 12.

Once the winding spindle 12 has again reached its retracted first position, the auxiliary turning tool 40 is removed and the screw connection 12 is reattached. As a result, the pin 6 and thus the winding spindle 12 is coupled in a rotationally rigid manner to the hollow shaft 2 and can no longer perform any axial movements. In this manner, the winding spindle 12 is coupled to the driving device (not shown) via the driving belt 8, the hollow shaft 2, the screw connection 10, and the pin 6, and is subjected to a continuous rotation. During this, the winding spindle 12 remains stationary in its first position. Since the spring-loading of the grooved rollers 18a, 18b, 18c generates an adequate friction lock between the filament 30 and the winding spindle 12, the filament 30 will be taken along in the winding direction by the rotation of the winding spindle 12, which results in the continuous production of the helical coil 36. This operating state is shown in FIG. 4c.

Hence, the sleeve 14 with its helical groove 16 serves as filament-shaping device to form the desired helical shape of the coils 36 to be produced, whereas the grooved rollers 18a, 18b, 18c in combination with the winding spindle 12 are responsible for the continued conveying of the helical coil 36 to ensure its continued continuous manufacture.

Since the grooved rollers 18a, 18b, 18c are freely rotatable, they will be subjected to a corresponding rotation when the filament 30 is wound onto the winding spindle 12 during the formation of the helical coil 36. As a result of this, the friction between the filament 30 or the helical coil 36 produced thereof and the grooved rollers 18a, 18b, 18c is significantly lower than that between the filament 30 or the helical coil 36 and the winding spindle 12. In this manner it is ensured that only the friction contact between the filament 30 or the helical coil 36 produced thereof and the winding spindle 12 has an effect, so that the winding spindle 12 during its rotation will be able to drag along the filament 30 to form the helical coil 36.

The above-described device is particularly suitable for forming helical coils out of a plastic filament, which preferably consists of a thermoplastic. In this case, the filament 30 is heated before it enters the sleeve 14. This can for example be accomplished by heating a drum (not shown) from which the filament 30 is uncoiled. Alternatively, it is possible to provide a separate heating device for the filament 30. A cooling device may be provided to cool the produced helical coil 36. But such a cooling device is not absolutely necessary, since it has been shown that the produced helical coil 36 will sufficiently cool on its own during its advance movement after being pulled off the winding spindle 12.

On principle, it is also possible to use the above-described device to manufacture a helical coil from metal wire.

The helical coil 36 produced with the help of the above-described device is used in the binding of brochures or books. For this purpose, the helical coil 36 is conveyed to a binding station, where it is cut to the desired length and is twisted into a corresponding pre-punched perforation of a stack of paper.

Due to the movable support of the grooved rollers 18a, 18b, 18c with respect to the winding spindle 12, it is on principle possible to manufacture helical coils of various diameters. However, for this purpose it is necessary to exchange the winding spindle 12 and the sleeve 14. If a different pitch is desired, it is necessary to exchange the grooved rollers 18a, 18b, and 18c as well.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A device to produce helical coils from a filament, comprising:
   a winding spindle rotatable in a winding direction;
   a filament-shaping device to wind the filament in a helical pattern onto the winding spindle in a feed direction, whereby the winding spindle extends beyond the filament-shaping device in the feed direction; and
   a pressing device located downstream of the filament shaping device in the feed direction, the pressing device adapted to press the filament against the winding spindle to generate friction contact between the filament and the winding spindle;
   wherein rotation of the winding spindle takes the filament in the winding direction.

2. Device according to claim 1,
   wherein the pressing device comprises at least one pressure element that is movable towards the winding spindle in a radial direction with respect to the winding spindle.

3. Device according to claim 2,
   wherein the at least one pressure element is preloaded towards the winding spindle.

4. Device according to claim 2,
   wherein the pressing device comprises several pressure elements, which are distributed circumferentially around the winding spindle.

5. Device according to claim 4,
   wherein adjacent pressure elements are substantially equally spaced apart from one another.

6. Device according to claim 5,
   comprising three pressure elements wherein adjacent pressure elements are separated from each other by an angular distance of approximately 120°.

7. Device according to claim 2,
   wherein the at least one pressure element includes at least one guiding groove on its side facing the winding spindle, the at least one guiding groove adapted to accept the filament.

8. Device according to claim 7, wherein the pressing device comprises three or more pressure elements, which are arranged circumferentially around the winding spindle, wherein the guiding grooves of the pressure elements are offset with respect to each other, in correspondence with a pitch of the helical coils.

9. Device according to claim 7,
   wherein each of the at least one pressure element includes a side facing the winding spindle, and each side facing the winding spindle includes a row of essentially parallel guiding grooves, with a distance between the guiding grooves corresponding to a distance between individual turns of the helical coils.

10. Device according to claim 8,
    wherein the rows of guiding grooves of the pressure elements are arranged offset with respect to each other, corresponding to the pitch of the helical coils.

11. Device according to claim 2,
    wherein the at least one pressure element comprises a rotatable roller with an axis of rotation that extends essentially parallel to an axis of rotation of the winding spindle.

12. Device according to claim 1,
wherein the filament-shaping device comprises a sleeve that concentrically surrounds the winding spindle and possesses a helical-shape filament guide.

13. Device according to claim 12,
wherein the sleeve includes a wall having an opening adapted to allow the filament to enter into the helical-shape filament guide.

14. Device according to claim 1,
wherein the winding spindle comprises an anchoring member adapted to secure the filament, the anchoring member being movable in an axial direction between a first position, for which the anchoring member is located in an upstream section of the filament-shaping device, and a second position, for which the anchoring member is located proximate the pressing device.

15. Device according to claim 14,
wherein the anchoring member comprises a hole formed in a casing of the winding spindle.

16. Device according to claim 14, further comprising:
a driving device adapted to continuously rotate the winding spindle,
wherein the driving device is adapted to be coupled to or decoupled from the winding spindle, when the winding spindle is in its first position, further wherein the driving device is always decoupled from the winding spindle when the winding spindle is in the second position.

* * * * *